(12) United States Patent
Chai et al.

(10) Patent No.: US 9,764,974 B2
(45) Date of Patent: Sep. 19, 2017

(54) SYSTEM FOR REDUCING EMISSION OF NITROUS OXIDE DURING SEWAGE TREATMENT

(71) Applicant: Chongqing University, Chongqing (CN)

(72) Inventors: Hongxiang Chai, Chongqing (CN); Qiang He, Chongqing (CN); Nanping AI, Chongqing (CN); Yu Liao, Chongqing (CN); Junhua Fang, Chongqing (CN); Wei Kang, Chongqing (CN)

(73) Assignee: CONGQING UNIVERSITY, Chongqing (CN)

( * ) Notice: Subject to any disclaimer, the term of this patent is extended or adjusted under 35 U.S.C. 154(b) by 446 days.

(21) Appl. No.: 14/599,973

(22) Filed: Jan. 19, 2015

(65) Prior Publication Data
US 2015/0315050 A1   Nov. 5, 2015

(30) Foreign Application Priority Data
May 4, 2014  (CN) .......................... 2014 1 0183438

(51) Int. Cl.
| | | |
|---|---|---|
| *C02F 3/02* | (2006.01) | |
| *C02F 3/30* | (2006.01) | |
| *B01D 33/70* | (2006.01) | |
| *C02F 3/32* | (2006.01) | |
| *C02F 101/16* | (2006.01) | |

(52) U.S. Cl.
CPC .............. *C02F 3/305* (2013.01); *C02F 3/302* (2013.01); *C02F 3/327* (2013.01); *C02F 2101/16* (2013.01); *C02F 2203/006* (2013.01); *C02F 2209/40* (2013.01); *Y02W 10/18* (2015.05)

(58) Field of Classification Search
CPC ........ C02F 2301/08; C02F 3/005; C02F 3/27; C02F 9/00; Y02W 10/18
USPC ............................ 210/170.03, 150, 253, 260
See application file for complete search history.

(56) References Cited

U.S. PATENT DOCUMENTS

| | | | | |
|---|---|---|---|---|
| 6,896,805 | B2* | 5/2005 | Austin | ..................... C02F 3/302 |
| | | | | 210/150 |
| 8,252,182 | B1* | 8/2012 | Chang | ...................... B01J 20/10 |
| | | | | 210/170.08 |
| 2003/0111408 | A1* | 6/2003 | Austin | ...................... C02F 3/06 |
| | | | | 210/601 |

* cited by examiner

*Primary Examiner* — Claire Norris
(74) *Attorney, Agent, or Firm* — Matthias Scholl, PC; Matthias Scholl

(57) ABSTRACT

A system for reducing emission of nitrous oxide during sewage treatment, including: a regulating pool, a first aerobic constructed wetland, an anoxic pool, and a second aerobic constructed wetland. The water outlet of the regulating pool is connected to the water inlet of the top of the first aerobic constructed wetland via a pipe and a first control valve. The first aerobic constructed wetland includes sequencing batch constructed wetlands arranged in parallel. A branch pipe and a second control valve are disposed on the pipe between the regulating pool and the first aerobic constructed wetland. The outlet of the branch pipe and the water outlet of the first aerobic constructed wetland are combined together and connected to the water inlet of the bottom part of the anoxic pool. The anoxic pool is an upward flow biological filter.

3 Claims, 2 Drawing Sheets

SYSTEM FOR REDUCING EMISSION OF NITROUS OXIDE DURING SEWAGE TREATMENT

CROSS-REFERENCE TO RELATED APPLICATIONS

Pursuant to 35 U.S.C. §119 and the Paris Convention Treaty, this application claims the benefit of Chinese Patent Application No. 201410183438.8 filed May 4, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to the field of wastewater treatment and environmental protection technology, and more particularly to a system for reducing emission of nitrous oxide during sewage treatment.

Description of the Related Art

Conventional systems for treating sewage in a sequencing batch constructed wetland only provide an aerobic condition in the nitrification phase. Although the production of the greenhouse gas is effectively controlled in the nitrification phase, an anoxic section is absent in the system. Therefore, the denitrification process is neglected resulting in low removal efficiency of total nitrogen (TN).

SUMMARY OF THE INVENTION

In view of the above-described problems, it is one objective of the invention to provide a system for reducing emission of nitrous oxide during sewage treatment. The production of $N_2O$ is reduced, the water quality of an effluent from the system satisfies the standard of urban recycling water-water quality standard for miscellaneous water consumption (e.g., GB/T18920-2002), and meanwhile, the TN removal efficiency is improved and the energy consumption is decreased.

To achieve the above objective, in accordance with one embodiment of the invention, there is provided a system for reducing emission of nitrous oxide during sewage treatment. The system comprises: a regulating pool, a first aerobic constructed wetland, an anoxic pool, and a second aerobic constructed wetland. A water outlet of the regulating pool is connected to a water inlet of a top of the first aerobic constructed wetland via a pipe and a first control valve. The first aerobic constructed wetland comprises sequencing batch constructed wetlands arranged in parallel. A branch pipe and a second control valve are disposed on the pipe between the regulating pool and the first aerobic constructed wetland. An outlet of the branch pipe and a water outlet of the first aerobic constructed wetland are combined together and connected to a water inlet of a bottom part of the anoxic pool. The anoxic pool is an upward flow biological filter. A water outlet of a sidewall of an upper part of the anoxic pool is connected to a water inlet of a top part of the second aerobic constructed wetland via a third control valve. The second aerobic constructed wetland comprises sequencing batch constructed wetlands arranged in parallel. Qualified treated water is discharged from a water outlet pipe arranged at a bottom part of the second constructed wetland.

The sewage stored in the regulating pool has two branches, one branch flows into the first aerobic constructed wetland, and the other branch flows into the anoxic constructed wetland. The first aerobic constructed wetland comprises four groups of constructed wetlands arranged in parallel and adopts continuous water feeding and continuous water discharging on the whole. Each group of the aerobic constructed wetland comprises four stages ladder-type hydraulic-drop aerobic constructed wetlands. Each stage constructed wetland adopts the sequencing batch operation. The effluent from the last stage aerobic constructed wetland is fully mixed with one part of the original sewage of the regulating pool and continuously enters the anoxic pool. The anoxic pool is the upward flow biological filter adopting a continuous flow operation. A mixed solution enters the anoxic pool from the bottom part thereof and is discharged from the anoxic pool from the sidewall at the top thereof. The sewage from the water outlet pipe of the anoxic pool enters the second aerobic constructed wetland in the form of hydraulic drop, and the qualified treated water is discharged from the water outlet pipe of the second aerobic constructed wetland. The second aerobic constructed wetland comprises four groups of constructed wetlands arranged in parallel and adopts continuous water feeding and continuous water discharging on the whole. Each group of the constructed wetlands of the second aerobic constructed wetland comprises a single-stage constructed wetland, and the single-stage constructed wetland adopts the sequencing batch operation.

Because the first aerobic constructed wetland is fed with water in the form of hydraulic drop, a contact area between the sewage and the air is increased in the hydraulic drop process. The air is carried by the sewage into the aerobic constructed wetlands, and a certain distance exists between the water inlet pipe and a substrate of the aerobic constructed wetland, thereby being beneficial for the hydraulic drop aeration. The aerobic constructed wetland adopts the sequencing batch operation, and the reaction time thereof is short. When a content of dissolved oxygen (DO) decreases to 0.5 mg/L below before reaching an anoxic state, the water starts to be discharged and enters a next stage constructed wetland. During the water discharging process, the substrate in the wetland fully contacts with the air, which provides a higher DO content for a next water feeding. Meanwhile, the aerobic constructed wetlands are planted with aquatic plants so as to transport the DO to the constructed wetlands. The anoxic pool is the upward flow biological filter. The effluent from the first aerobic constructed wetland and one part of the original sewage are mixed and enter the anoxic pool from the bottom part thereof. The anoxic pool always maintains at a continuous flow state and is covered by the cover. The anoxic pool is not aerated or planted with any aquatic plant, so that the oxygen enrichment effect is poor and the anoxic state therein is reached. The original sewage of the regulating pool is mixed with the nitrification liquid before entering the anoxic pool, which provides the carbon source for the denitrification process in the anoxic pool. Not only is the denitrification efficiency improved, but also a C/N ratio is controlled between 5 and 10 by regulating the ratio of the original sewage to the nitrification liquid, thereby decreasing the production of $N_2O$.

Advantages of the system according to embodiments of the invention are as follows: the aerobic constructed wetland maintains at a high DO content so that a nitrite is totally oxidized into a nitrate, the nitrification process is totally completed, and the production of $N_2O$ is reduced. The anoxic pool is kept at the anoxic state and the carbon source is sufficient, thus, the denitrification process is thoroughly conducted. As the final product of the denitrification process is $N_2$, the emission of $N_2O$ is reduced. In addition, the sufficient carbon source accelerates the denitrification efficiency and improves the removal efficiency of the TN. The whole procedure adopts the gravity flow, thereby decreasing the energy consumption.

BRIEF DESCRIPTION OF THE DRAWINGS

The invention is described hereinbelow with reference to the accompanying drawings, in which.

Figure 1:
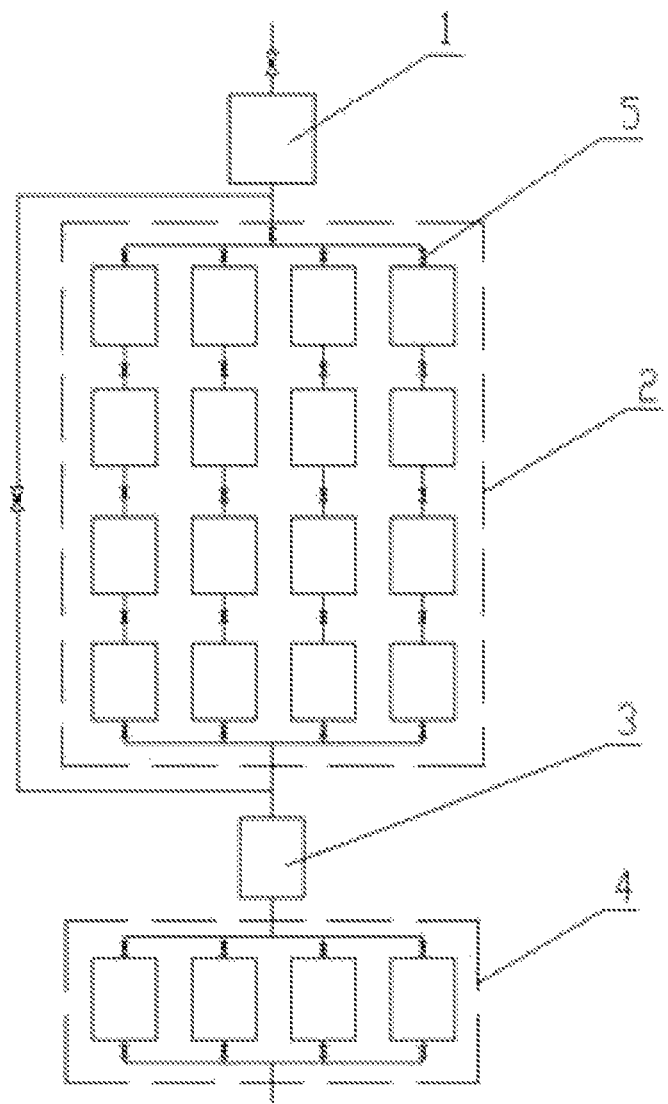
FIG. 1 is a schematic diagram of a system for reducing emission of nitrous oxide in accordance with one embodiment of the invention.

In the drawings, the following reference numbers are used: 1. Regulating pool; 2. First aerobic constructed wetland; 3. Anoxic pool; 4. Second aerobic constructed wetland; 5. Control valve; 11. Gravel; 12. Covering soil; 13. Aquatic plants; 14. Cover; 15. Water outlet pipe; 16. Glass-cloth honeycomb filter; 17. Supporting layer; 18. Mud pipe; and 19. Water distribution pipe.

DETAILED DESCRIPTION OF THE EMBODIMENTS

For further illustrating the invention, experiments detailing a system for reducing emission of nitrous oxide during sewage treatment are described below. It should be noted that the following examples are intended to describe and not to limit the invention.

Conception of the system of the invention is as follows: sequencing batch aerobic constructed wetlands are combined with a continuous flow anoxic biological filter in the system for the purpose of treating reclaimed water.

Figure 2:
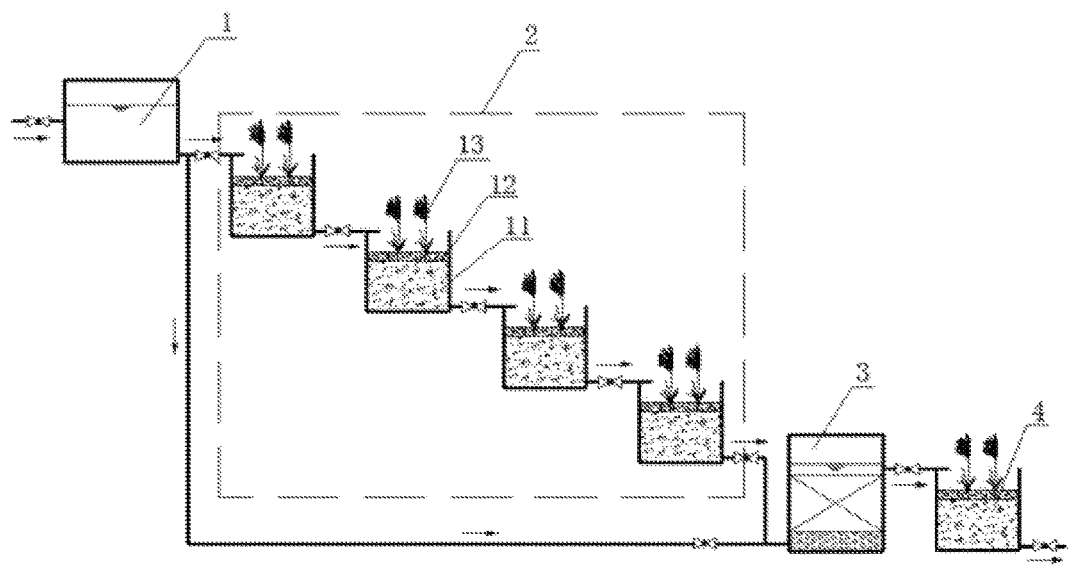
FIG. 2 is an elevation view of a system for reducing emission of nitrous oxide in accordance with one embodiment of the invention.

A system for reducing emission of nitrous oxide during sewage treatment is shown in FIGS. 1-2. The system comprises: a regulating pool 1, a first aerobic constructed wetland 2, an anoxic pool 3, and a second aerobic constructed wetland 4. A water outlet of the regulating pool 1 is connected to a water inlet of a top of the first aerobic constructed wetland 2 via a pipe and a first control valve. The first aerobic constructed wetland 2 is sequencing batch constructed wetlands arranged in parallel. A branch pipe and a second control valve are disposed on the pipe between the regulating pool 1 and the first aerobic constructed wetland 2. An outlet of the branch pipe and a water outlet of the first aerobic constructed wetland 2 are combined together and connected to a water inlet of a bottom part of the anoxic pool 3. The anoxic pool 3 is an upward flow biological filter. A water outlet of a sidewall of an upper part of the anoxic pool 3 is connected to a water inlet of a top part of the second aerobic constructed wetland 4 via a third control valve. The second aerobic constructed wetland 4 is sequencing batch constructed wetlands arranged in parallel. Qualified treated water is discharged from a water outlet pipe arranged at a bottom part of the second constructed wetland 4.

The first aerobic constructed wetland 2 comprises four groups of sequencing batch aerobic constructed wetlands arranged in parallel. Each group of the sequencing batch aerobic constructed wetland comprises four stage ladder-type hydraulic-drop aerobic constructed wetlands. A water outlet of a bottom part of a former stage aerobic constructed wetland is connected to a water inlet of a top part of a later stage aerobic constructed wetland via a pipe and a control valve. Water outlets of the last stage aerobic constructed wetlands of the four groups of the sequencing batch aerobic constructed wetlands arranged in parallel are combined together.

The second aerobic constructed wetland 4 comprises four groups of single-stage sequencing batch aerobic constructed wetlands.

Gravel 11 having a grain size of between 40 and 60 mm, a covering soil layer 12, and aquatic plants 13 are arranged from bottom to top in each aerobic constructed wetland. The aquatic plants 13 have developed root system, strong oxygen carrying capability, and a planting density of 15 plants/m².

Figure 3:
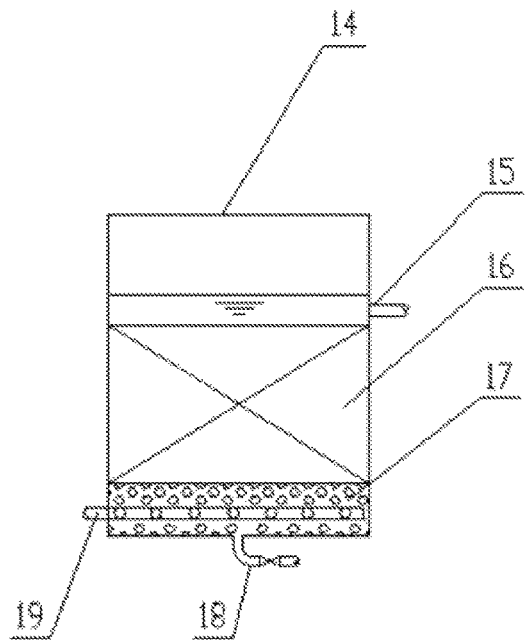
FIG. 3 is a cross-sectional view of an anoxic pool in accordance with one embodiment of the invention.

As shown in FIG. 3, a gravel supporting layer 17 is disposed at the bottom part of the anoxic pool 3. A water distribution pipe 19 for feeding water is buried in the gravel supporting layer 17. A mud pipe 18 is disposed at a bottom surface of the anoxic pool 3. A glass-cloth honeycomb filter 16 is disposed on the gravel supporting layer 17. A water outlet pipe 15 is disposed at the sidewall of the upper part of the anoxic pool 3. A cover 14 is disposed at a top part of the anoxic pool 3. The anoxic pool 3 is the upward flow biological filter. The sewage uniformly enters the anoxic pool 3 through the water distribution pipe 19 in the gravel supporting layer 17 via the bottom thereof of the anoxic pool, and flows upwardly and passes through the glass-cloth honeycomb filter 16. The treated water is discharged from the water outlet pipe 15 arranged at the upper part of the anoxic pool, and the aging sludge is periodically drained out from the mud pipe 18 of the bottom of the anoxic pool.

Taken the first aerobic constructed wetland 2 comprising four groups of aerobic constructed wetlands as an example, the water feeding modes are specifically as follows:

0-1 hr: feeding water to the first stage constructed wetland of the first group;

1-2 hrs: feeding water to the first stage constructed wetland of the second group; and conducting reaction in the first stage constructed wetland of the first group;

2-3 hrs: feeding water to the first stage constructed wetland of the third group; conducting reaction in the first stage constructed wetland of the second group; and continuing reaction in the first stage constructed wetland of the first group; and 3-4 hrs: feeding water to the first stage constructed wetland of the fourth group; conducting reaction in the first stage constructed wetland of the third group; continuing reaction in the first stage constructed wetland of the second group; and continuing reaction in the first stage constructed wetland of the first group and meanwhile draining water therefrom and feeding water to the second stage constructed wetland of the first group.

The cycling mode of each stage is the same as that in the first stage constructed wetland of the first group. That is, each stage constructed wetland operates for 4 hrs; and each group begins to drain water after the group operates for 13 hrs.

12-13 h: draining water from the fourth stage constructed wetland of the first group into the anoxic pool;

13-14 h: draining water from the fourth stage constructed wetland of the second group into the anoxic pool;

14-15 h: draining water from the fourth stage constructed wetland of the third group into the anoxic pool; and 15-16 h: draining water from the fourth stage constructed wetland of the fourth group into the anoxic pool.

The anoxic pool adopts the continuous flow operation, and each stage constructed wetland adopts the sequencing batch operation. Thus, the whole system is in the continuous flow operation.

A volume ratio of a denitrification liquid effluent of the fourth stage aerobic constructed wetland of each group to an original sewage from the regulating pool 1 is between 100% and 300%. The denitrification liquid and the original sewage are fully mixed before entering the anoxic pool.

The first aerobic constructed wetland 2 and the second aerobic constructed wetland 4 are planted with aquatic plants having developed root system for transporting oxygen to the constructed wetlands, while the anoxic pool 3 is not planted with any plant and is covered by the cover.

Working process of the first aerobic constructed wetland 2 is as follows:

Water feeding: a control valve 5 is opened to feed the sewage from the regulating pool, so that the sewage successively enters the first stage aerobic constructed wetlands, the reacted sewage is dropped to the subsequent stage aerobic constructed wetlands. After the first stage constructed wetland of the first group is fed with the sewage for 1 hr, the sewage begins to enter the first stage aerobic constructed wetland of the second group; after the first stage constructed wetland of the second group is fed with the sewage for 1 hr, the sewage begins to enter the first stage constructed wetland of the third group; and after the first stage constructed wetland of the third group is fed with the sewage for 1 hr, the sewage begins to enter the first stage constructed wetland of the fourth group. A time interval for the fourth stage of each group to discharge the sewage is 1 hr, and the sewage continuously enters the anoxic pool 3. Therefore, a continuous flow of the anoxic pool is ensured. The effluent from the anoxic pool is successively discharged to the single-stage aerobic constructed wetland of the second aerobic constructed wetland 4.

Reaction: the sewage carries a large amount of oxygen when it enters a next stage aerobic constructed wetland via a water inlet pipe, meanwhile, a substrate in the wetland fully contacts with the air during the sewage discharging process. As oxygen is fully enriched in the wetland substrate, a high dissolved oxygen content is always ensured in the wetland, the denitrification reaction well proceeds, a $N_2O$ flux decreases, and the sewage is purified under the effect of the microbes' reaction and the absorption of the filler and the plants. The effluent from each group of the aerobic constructed wetland successively enters the anoxic pool at the above time interval. A continuous flow is maintained in the anoxic pool, the anoxic pool is neither aerated nor planted with any plants, and is covered by the cover, so that the anoxic state is ensured in the anoxic pool, and an intermediate $N_2O$ of the denitrification is transformed into a final product $N_2$. The aerobic nitrification liquid and the original sewage of the regulating pool are mixed and enter the anoxic pool, the original sewage provides a carbon source as an electron donor, and the nitrification liquid serves as an electron acceptor. The denitrification reaction is fully conducted, the production of $N_2O$ is decreased, and the removal efficiency of TN is improved.

Water discharging: the sewage is reacted in each stage constructed wetland of each group of the first aerobic constructed wetland for 2 hrs and enters a next stage constructed wetland using a height difference of the terrain. The effluent from the fourth stage constructed wetland of each group continuously enters the anoxic pool. The effluent from the anoxic pool enters the second aerobic constructed wetland. The substrate fully contacts with the air during the drainage process, so that the oxygen-enrichment effect is good.

Compared with the prior art, the system of the invention has the following advantages:

1. The aerobic constructed wetland adopts the sequencing batch operation mode, the wetland alternates between a dry state and a wet state. The substrate fully contacts with the air during the drainage process, and air is fully enriched. Thus, a high DO content is ensured in the constructed wetland, the nitrite is totally oxidized in the denitrification process, and the $N_2O$ emission is reduced.
2. The aerobic constructed wetlands are connected in series in the hydraulic drop mode for feeding water. The hydraulic drop process increases the contact area between the sewage and the air and functions in hydraulic drop aeration. The DO content in the constructed wetland is increased, the nitrification reaction is accelerated, and the emission of $N_2O$ is reduced.
3. The four groups of the aerobic constructed wetlands of the first aerobic constructed wetland 2 operate in parallel. The time interval for feeding water of the four groups is 1 hr, and the time interval for discharging water is also 1 hr. The effluent from the four groups of the aerobic constructed wetlands continuously enters the anoxic pool. The anoxic pool adopts the continuous flow operation and is kept in the anoxic state where oxygen enrichment is prevented, so that nitrous oxide reductase has high activity, the $N_2O$ flux discharged in the denitrification process is decreased.
4. A part of the original sewage of the regulating pool enters the anoxic pool after being fully mixed with the nitrification liquid from the aerobic constructed wetlands. The carbon source provided by the original sewage serves as the electron donor so as to ensure the denitrification reaction, reduce the $N_2O$ emission, and improve the TN removal efficiency.
5. The operation process of the system utilizes the gravity flow, so that a lifting device for the sewage is not necessitated, thereby decreasing the energy consumption.

Primary technical parameters of the embodiment are as follows:

hydraulic loading: between 0.6 and 1 $m^3/m^2 \cdot d$;
hydraulic retention time (HRT): the HRT of the aerobic constructed wetlands is 2 hrs, and the HRT of the anoxic pool is 1 hr;
water feeding time and water discharging time: the water feeding time of the sequencing batch constructed wetland is 1 hr, and the water discharging time thereof is 1 hr; and
dissolved oxygen: the dissolved oxygen in the anoxic pool is between 0.5 and 1.0 mg/L, and the dissolved oxygen in the aerobic constructed wetland is between 2 and 3 mg/L.

Construction parameters are as follows:
A length-width ratio of the constructed wetland is larger than 1:1.
A height of the covering soil layer is 0.1 m.
A caliber of the water outlet pipe is 30 mm.
A distance between the water inlet pipe of the aerobic constructed wetland and the covering soil layer is 0.2 m.

A height of the anoxic pool is between 3 and 4 m, and a height of the glass-cloth honeycomb filter is between 2.5 and 3 m.

The water quality of the effluent of the constructed wetland satisfies the criteria of urban recycling water-water quality standard for miscellaneous water consumption (GB/T18920-2002).

In conditions of a best hydraulic loading, compared with the conventional system for removing nitrogen and phosphorus, the system of the invention has an average emission flux of $N_2O$ of 179.94 $\mu g\ m^{-2}hr^{-1}$, and the emission reduction thereof is increased by between 5% and 10%. The system of the invention has a better effect of TN removal efficiency compared with the single sequencing batch aerobic constructed wetland.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for reducing emission of nitrous oxide during sewage treatment, the system comprising: a regulating pool, a first aerobic constructed wetland, an anoxic pool, and a second aerobic constructed wetland;

wherein
- a water outlet of the regulating pool is connected to a water inlet of a top of the first aerobic constructed wetland via a pipe and a first control valve;
- the first aerobic constructed wetland comprises sequencing batch constructed wetlands arranged in parallel;
- a branch pipe and a second control valve are disposed on the pipe between the regulating pool and the first aerobic constructed wetland;
- an outlet of the branch pipe and a water outlet of the first aerobic constructed wetland are combined together and connected to a water inlet of a bottom part of the anoxic pool;
- the anoxic pool is an upward flow biological filter;
- a water outlet of a sidewall of an upper part of the anoxic pool is connected to a water inlet of a top part of the second aerobic constructed wetland via a third control valve;
- the second aerobic constructed wetland comprises sequencing batch constructed wetlands arranged in parallel;
- qualified treated water is discharged from a water outlet pipe arranged at a bottom part of the second constructed wetland;
- gravel having a grain size of between 40 and 60 mm, covering soil layer, and aquatic plants are arranged from bottom to top in each aerobic constructed wetland;
- a gravel supporting layer is disposed at the bottom part of the anoxic pool;
- a water distribution pipe for feeding water is buried in the gravel supporting layer;
- a mud pipe is disposed at a bottom surface of the anoxic pool;
- a glass-cloth honeycomb filter is disposed on the gravel supporting layer;
- a water outlet pipe is disposed at the sidewall of the upper part of the anoxic pool; and
- a cover is disposed at a top part of the anoxic pool.

2. The system of claim 1, wherein
- the first aerobic constructed wetland comprises four groups of sequencing batch aerobic constructed wetlands arranged in parallel;
- each group of the sequencing batch aerobic constructed wetland comprises four stage ladder-type hydraulic-drop aerobic constructed wetlands;
- a water outlet of a bottom part of a former stage aerobic constructed wetland is connected to a water inlet of a top part of a later stage aerobic constructed wetland via a pipe and a control valve; and
- water outlets of the last stage aerobic constructed wetlands of the four groups of the sequencing batch aerobic constructed wetlands arranged in parallel are combined together.

3. The system of claim 2, wherein the second aerobic constructed wetland comprises four groups of single-stage sequencing batch aerobic constructed wetlands.

* * * * *